US 8,000,466 B2

(12) United States Patent
Caspi et al.

(10) Patent No.: US 8,000,466 B2
(45) Date of Patent: Aug. 16, 2011

(54) METHOD AND APPARATUS FOR MULTIPARTY COLLABORATION ENHANCEMENT

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1576 days.

(21) Appl. No.: 11/218,411

(22) Filed: Sep. 1, 2005

(65) Prior Publication Data

US 2007/0050451 A1   Mar. 1, 2007

(51) Int. Cl.
  H04M 1/00    (2006.01)
  H04M 9/00    (2006.01)
  H04M 3/42    (2006.01)
  H04L 12/16   (2006.01)

(52) U.S. Cl. ......... 379/388.07; 379/388.02; 379/406.01; 379/202.01; 370/260

(58) Field of Classification Search ............. 379/388.02, 379/388.07, 406.01, 202.01; 370/260, 268, 370/269
See application file for complete search history.

(56) References Cited

U.S. PATENT DOCUMENTS

| 6,888,925 | B2 * | 5/2005 | Spitzer et al. ............... 379/15.01 |
| 7,155,018 | B1 * | 12/2006 | Stokes et al. .............. 379/406.01 |
| 2003/0073927 | A1 * | 4/2003 | Johansen et al. .............. 600/559 |
| 2003/0083059 | A1 | 5/2003 | Spitzer et al. |
| 2005/0213731 | A1 * | 9/2005 | Rodman et al. .......... 379/202.01 |
| 2005/0286443 | A1 * | 12/2005 | McMillen et al. ............. 370/260 |
| 2006/0230106 | A1 * | 10/2006 | McDonald .................... 709/204 |

* cited by examiner

Primary Examiner — Ahmad F Matar
Assistant Examiner — Nafiz E Hoque

(57) ABSTRACT

A telecommunications system includes a network; a plurality of user devices operably coupled to said network and including a microphone and a speaker; a collaboration server configured to cause a playing of one or more test tones at said plurality of user devices and compensate for feedback if said test tones are detected by microphones associated with said plurality of user devices.

17 Claims, 4 Drawing Sheets

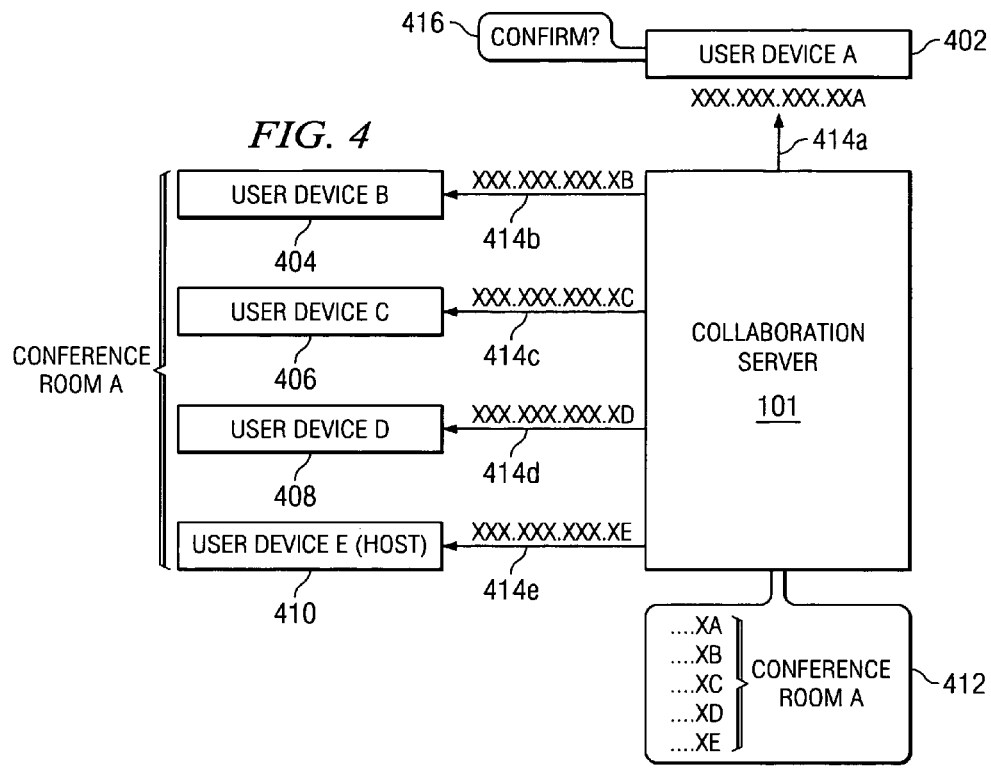
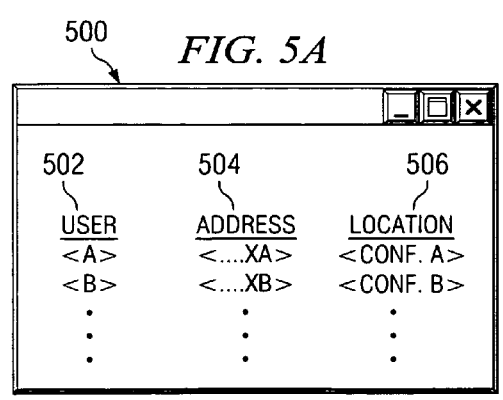
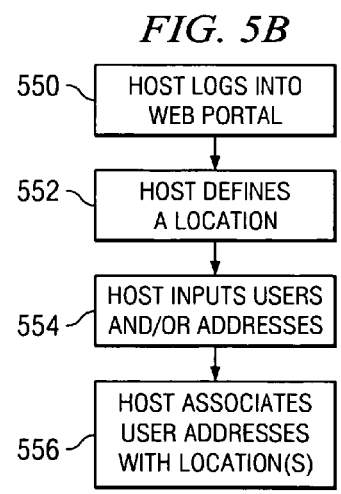

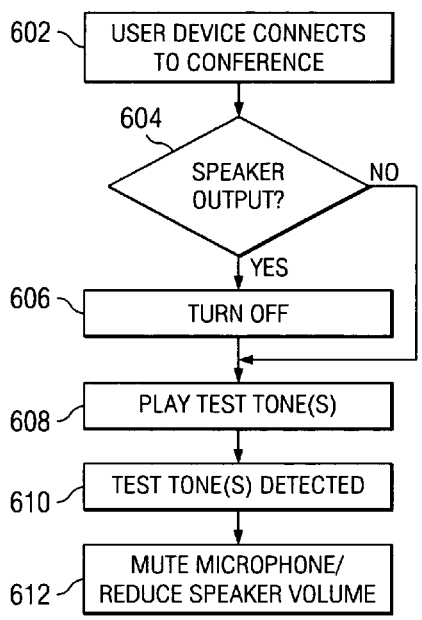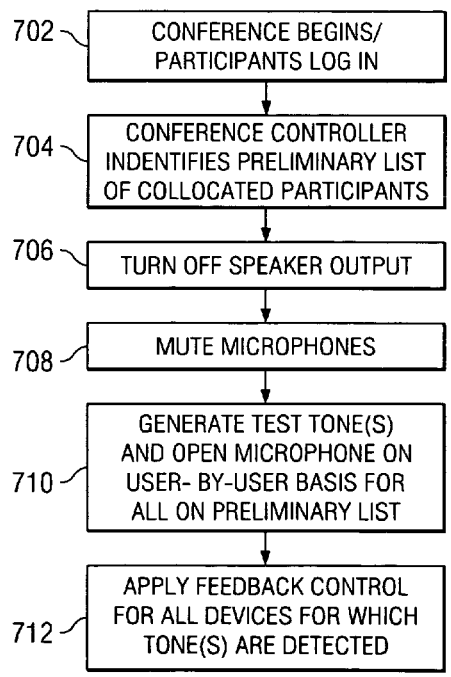

METHOD AND APPARATUS FOR MULTIPARTY COLLABORATION ENHANCEMENT

BACKGROUND OF THE INVENTION

1. Field of the Invention

The present invention relates to telecommunications systems and, in particular, to an improved teleconferencing system.

2. Description of the Related Art

Modern telecommunications systems allow users to communicate with each other using voice and/or web collaboration conferences. In multiparty collaboration sessions, multiple users, each equipped with a computer, such as a personal or laptop computer, may be participating from a single conference room. Other parties may be collaborating remotely from different sites. The collaboration session typically involves a conference call that allows for document sharing, voice communications, etc. The beginning of such conferences can be problematic in that all the microphones and speakers from the laptop computers in the same conference room can cause squeal from audio feedback.

As such, there is a need for a conferencing system with reduced feedback. There is a further need for a system and method for minimizing feedback during conference sessions.

SUMMARY OF THE INVENTION

These and other drawbacks in the prior art are overcome in large part by a system and method according to embodiments of the present invention.

A conferencing method in accordance with embodiments of the present invention includes identifying a preliminary set of collocated conference participants; muting a microphone associated with each of the preliminary set; generating one or more test tones for playing on a speaker associated with each of the preliminary set; opening a microphone associated with each of the preliminary set; and detecting as collocated conference participants for whom the microphone detects the one or more test tones.

A telecommunications system in accordance with embodiments of the present invention includes a network; a plurality of user devices operably coupled to said network and including a microphone and a speaker; a collaboration server configured to cause a playing of one or more test tones at said plurality of user devices and compensate for feedback if said test tones are detected by microphones associated with said plurality of user devices.

A telecommunications system according to other embodiments of the present invention includes a conference controller configured to supervise teleconferences; and a feedback controller configured to monitor locations of collocated user devices participating in a particular teleconference and provide feedback control to said collocated user devices. The feedback control includes transmitting commands to user devices to turn off associated microphones and speakers; on a device by device basis, causing the microphones and speakers to be turned on and one or more tones to be played; detecting the one or more tones at the associated user devices; and providing one or more I/O commands to control a speaker or microphone to control feedback.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a diagram schematically illustrating operation of an embodiment of the present invention.

FIG. 5A is an exemplary user interface according to an embodiment of the present invention.

FIG. 5B is a flowchart illustrating operation of an embodiment of the present invention FIG. 6 is a flowchart illustrating operation of an embodiment of the present invention.

FIG. 7 is a flowchart illustrating operation of an embodiment of the present invention.

DETAILED DESCRIPTION OF EMBODIMENTS OF THE INVENTION

Figure 1:
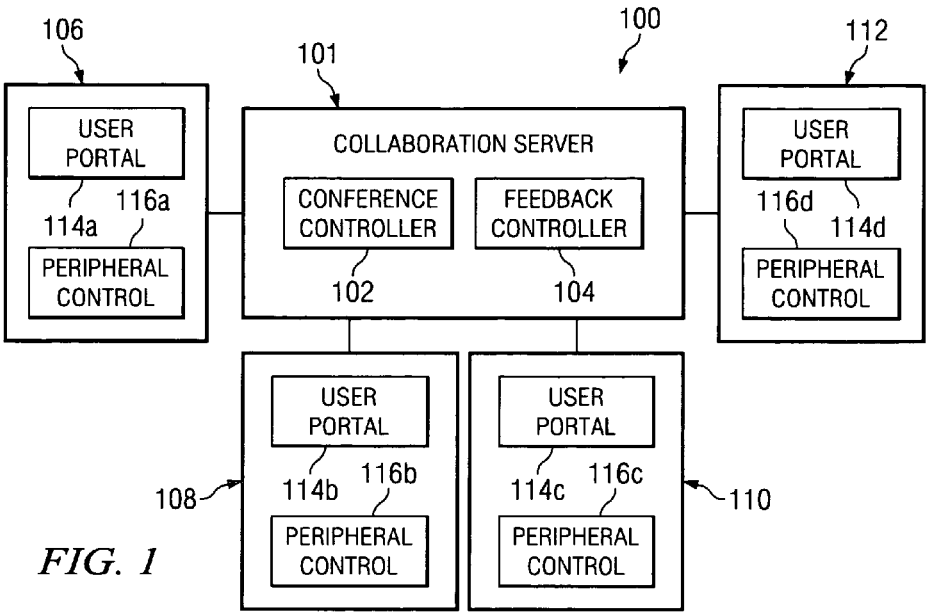
FIG. 1 is a diagram schematically illustrating a system according to embodiments of the present invention.

Turning now to the drawings and, with particular attention to FIG. 1, a diagram of a telecommunications system 100 according to an embodiment of the present invention is shown. The system includes a collaboration service or server 101, which may include, be operably coupled to, or be in communication with a conference controller 102 and a feedback controller 104. The collaboration service 101 may implement or be in communication with one or more devices that implement teleconferencing services, such as those of a multipoint control unit or conferencing bridge.

User devices, such as user devices 106, 108, 110, 112 may be operably coupled to or in communication with the collaboration server 101, including the conference controller 102 and the feedback controller 104. In some embodiments, a user device may be or include such things as telephones, cellular telephones, PDAs, computers, etc. For example, the user devices 106, 108, 110, 112 may be personal computers implementing the Windows XP™ operating system. In addition, the user devices 106, 108, 110, 112 may include telephony and other multimedia messaging and conferencing capability using, for example, peripheral cameras, Webcams, microphones and speakers (not shown) or peripheral telephony handsets, such as the Optipoint™ handset available from Siemens Communications, Inc.

The user devices may be equipped with server or web access portals 114a-114d, respectively, for communicating with the collaboration server 101, as will be explained in greater detail below. In accordance with embodiments of the present invention, the server access portals 114a-114d may be used to participate in and arrange collaboration sessions and teleconferences. Thus, the server access portals 114a-114d provide for bi-directional communication of signaling, setup, and control for, among other things, collaboration sessions. In certain embodiments, the server access portals 114a-114d may be embodied as web browsers, such as Microsoft Explorer, Netscape Navigator, and Mozilla Firefox, and any necessary add-ons and cooperating programs, as will be described in greater detail below. In addition, one or more of the user devices may be equipped with peripheral controls 116a-116d, which may receive one or more commands from the feedback controller 104 (typically via server access portals 114a-114d), and may be used to adjust settings on devices such as microphones and speakers.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The conference controller 102 allows the user to set up and maintain audio or multimedia teleconferencing sessions. Thus, the conference controller 102 may implement any necessary conference switching and/or mixing. The conference controller 102 may be implemented in hardware and/or software operating on one or more servers, computer systems, host or mainframe computers, workstations, etc. In some embodiments, the conference controller 102 may be operating on some or all of the same devices as other components in the system 100.

The feedback controller 104 operates in conjunction with the conference controller 102 to identify collocated user devices and provide feedback control, as will be explained in greater detail below. The feedback controller 104 may be implemented in hardware and/or software operating on one or more servers, computer systems, host or mainframe computers, workstations, etc. In some embodiments, the feedback controller 104 may be operating on some or all of the same devices as other components in the system 100.

Figure 2:
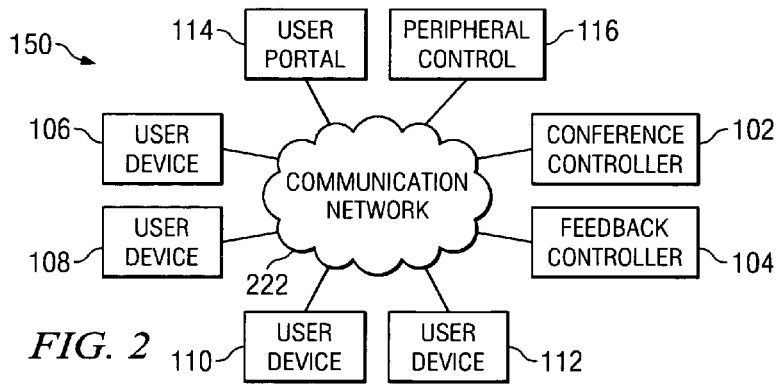
FIG. 2 is a diagram schematically illustrating a system according to embodiments of the present invention.

In certain embodiments of the present invention, one or more of the components of the system 100 may be connected to or in communication with each other via a communication network. For example, turning now to FIG. 2, a system 150 including various components of the system 100 is illustrated, wherein some or all of the components are in communication via a network 222. The network 222 may be or include the Internet, World Wide Web, a local area network, or some other public or private computer, cable, telephone, client/server, peer-to-peer, or communication network or intranet. In some embodiments, the communication network 222 can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 222 may be implemented using a TCP/IP network and may implement voice or multimedia over IP using, for example, the Session Initiation Protocol (SIP).

An exemplary environment capable of being adapted for use in a system according to embodiments of the present invention is the OpenScape system, available from Siemens Communications, Inc. Such an environment can be implemented, for example, in conjunction with Windows Server, Microsoft Office Live Communications Server, Microsoft Active Directory, Microsoft Exchange and SQL Server.

Figure 3:
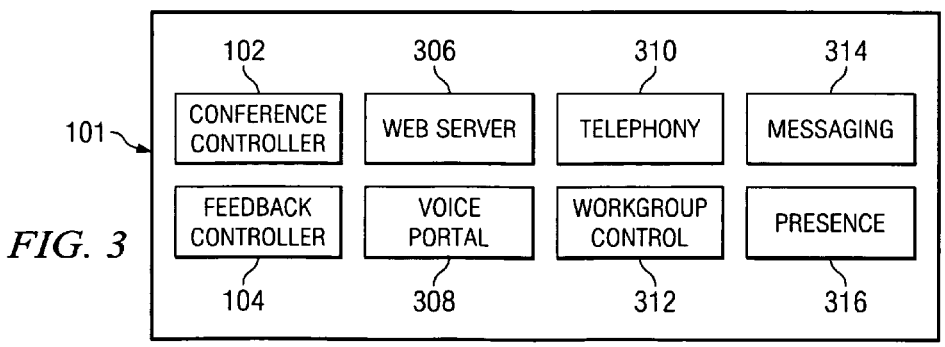
FIG. 3 is a block diagram of an exemplary collaboration server in accordance with an embodiment of the present invention.

A block diagram illustrating several components of a server in accordance with embodiments of the present invention is shown in FIG. 3. As shown, the server environment can include, be operably coupled to or in communication with one or more control modules, such as a conference controller 102, a web server 306, feedback controller 104, voice portal 308, telephony portal 310, workgroup control 312, messaging portal (text, e-mail, instant messaging, SMS, etc.) 314 and presence portal 316.

The conferencing control module 102 allows the user to set up audio or multimedia conference sessions. The feedback control module 104 allows for control of feedback at user devices when collocated during a collaboration or teleconference. The voice portal 308 provides user access to groupware features via the telephone. The voice portal 308 may be implemented, for example, as an interactive voice response (IVR) system capable of receiving voice and/or DTMF inputs. The workgroup control 312 allows users to initiate audio or multi-media conferencing sessions and view documents that have been checked in to a workgroup repository (not shown). The telephony module 310 allows the server 101 to act as a telephony feature provider/switch. The messaging portal 314 may be implemented as one or more text or multimedia messaging systems, such as e-mail, Instant Messaging, or Short Messaging Service (SMS). The presence portal 316 allows for monitoring the presence states or contexts of various users. It is noted that these various modules may be implemented as various combinations of software, hardware, and/or firmware.

Operation of an embodiment of the present invention is illustrated more particularly by way of example with reference to FIG. 4. Shown in FIG. 4 is an exemplary collaboration server 101 and a plurality of user devices 402, 404, 406, 408, 410. User device 404 is associated with an IP address xxx.xxx.xxx.xxA; user device 404 is associated with an IP address xxx.xxx.xxx.xxB; user device 406 is associated with an IP address xxx.xxx.xxx.xxC; user device 408 is associated with an IP address xxx.xxx.xxx.xxxD; and user device 410 is associated with an IP address xxx.xxx.xxx.xxE.

In the example illustrated, a user device E 410 is designated as "host." Typically, the host is responsible for scheduling the conference (including, for example, arranging availability of facilities) and can also input the preliminary location-correlation information concerning which user devices are collocated. For example, user devices 404, 406, 408, and 410 are collocated in Conference Room A, while user device 402 is located remotely. The host user device E 410 can be used to upload to the server 101 the IP address-location correlation information, for example, via a suitable web-type interface. That is, the IP address or other identification information is uploaded and associated with a particular location. As shown, at 412, the host 410 has uploaded information to the server indicating that all the user devices 402, 404, 406, 408, 410 are to be collocated in a conference room A, although in the example shown, user device A 402 if fact is not.

In operation, as noted above, at a designated time or times, the users can join the conference. This can include the user devices logging in to the server, setting up one or more communication channels 414a, 414b, 414c, 414d, 414e, and transmitting their IP addresses and/or other or additional identification information. The collaboration server 101 then receives this information and compares it to the data the host 410 had sent concerning collocation of conference participants.

Once the conference is joined, the collaboration server 101 can use the channel or channels 414a, 414b, 414c, 414d, 414e to transmit commands to the collocated user devices. Initially, the server 101 sends a command to turn off their microphones. The server 101 will then, on a device by device basis, turn on or cause the microphones to be turned on, and cause a tone or tones to be played over the user device's speaker. If the tone or tones are detected, then the device is determined to be collocated in the same conference room. For example, the peripheral controller 116 (FIG. 1) may be programmed or otherwise configured to detect tones above a particular loudness threshold. Alternatively, the peripheral controller 116 may be programmed or otherwise configured to identify tones having a particular frequency or audio content. In either case, if detected, feedback control is provided, either by muting the microphone or lowering speaker volume, for all of the collocated user devices (other than the host or other designated party or device).

It is noted that the feedback control itself may be provided either from the server 101 or locally at the user device. For example, in certain embodiments, the feedback control may take the form of one or more signals from the server to the user device. The user device responds to the signals by activating a feedback control routine (e.g., at the peripheral control), which performs a pre-set feedback control routine. In other embodiments, the feedback control 104 of the server itself specifies the particular feedback control that is to be used, i.e., directly controlling the peripheral control 116's control of the device speaker and/or microphone.

As noted above, while the user device A 402 is preliminarily deemed by the server 101 to be collocated, in the example shown, it is not. To prevent erroneously receiving feedback correction, user devices may be programmed to include a confirmation routine or routines 412 that would run responsive to reception of the feedback control communications from the server 101. Typically, this could be implemented as a browser pop up window or windows, and allow the user to elect feedback control.

FIG. 5A illustrates an exemplary window or graphical user interface 500 that may be used by a conference host, system administrator, or other party to associate conference participants with a common location. The window or graphical user interface 500 may form a pop-up window associated with a web or user access portal 114. As shown, the window 500 allows entries for user 502, address 504, and location 506. In typical operation, a host can enter, for example, via typing, drop down menu selection (not shown), or any suitable user interface method, users, addresses, and their associated locations. In certain embodiments, the address may be automatically associated with particular users, so that individual selection is not necessary.

Turning now to FIG. 5B, a flowchart illustrating operation of an embodiment of the present invention is shown. The particular arrangement of elements in the flowchart is not meant to imply a fixed order to the elements; embodiments can be practiced in any order that is practicable.

In a step 550, a user, such as a conference host or a system administrator, can log in using the web or user access portal 114 and, particularly, to the relevant interface or Internet or Intranet web page, such as window 500, to be used for configuring the conference. In a step 552, the host or administrator can define one or more locations to be used for the conference. Typically, the location(s) will be one or more conference rooms or offices. More than one location may have multiple collocated users during the course of a given conference. Further, while a host may define a location on a conference-by-conference basis, the common locations may be predefined by a system administrator or other authorized user.

In a step 554, the host or administrator can use the browser window 500 to enter conference users and their IP addresses. Again, these may be configured beforehand by a system administrator or other authorized user, in which case, the conference host need merely select, such as via a drop down menu, cursor pointing device selection from a list, or text entry, the user name.

Finally, in a step 556, the host can associate the various users and IP addresses with their predicted locations. For example, the host may use a cursor pointing device to highlight and select the user and location.

Turning now to FIG. 6, a flowchart illustrating operation of an embodiment of the present invention is shown. The particular arrangement of elements in the flowchart is not meant to imply a fixed order to the elements; embodiments can be practiced in any order that is practicable.

In particular, FIG. 6 illustrates operation of an embodiment of the present invention with respect to a single potentially collocated user device, such as a laptop computer (i.e., with respect to a user device that may be collocated with other user devices). Initially, in a step 602, a user device can connect to a conference. For example, the user device can call in to the server at a designated time, and connect using a web interface, such as user access portal 114. In a step 604, the feedback control 104 communicates (typically via the server access portal 114) with the peripheral control 116 to determine if there is currently a speaker output. If there is, then in a step 606, the feedback control 104 directs the peripheral control 116 to turn it off. Next, in a step 608, the feedback control 104 can cause the peripheral control 116 to play a test tone or tones (or tune) over the user device's speaker. For example, the collaboration server 101 can play a streaming video, can transmit an audio file for playing, or otherwise direct the peripheral control 116 to play a tone. In a step 610, the test tone can be detected by the user device's microphone. As noted above, this can include detecting a tone above a certain threshold or by detecting a tone having particular audio content. If detected, then in a step 612, the feedback control 104 can control a suppression of feedback, such as by muting the microphone or lowering the volume of the speaker.

Turning now to FIG. 7, a flowchart illustrating operation of an embodiment of the present invention is shown. The particular arrangement of elements in the flowchart is not meant to imply a fixed order to the elements; embodiments can be practiced in any order that is practicable.

In particular, in a step 702, the conference can begin; that is, the participants can log in using their user devices 106, 108, 110, 112. As noted above, this can include the users logging in via their web or user portals 114. Next, in a step 704, the conference controller 102 identifies the preliminary list of collocated participants. As noted above, this can be accomplished in a variety of ways. For example, the conference controller 102 could identify the IP addresses and their associations with a particular location.

In a step 706, the feedback controller 104 can send one or more commands instructing the user devices to turn off the speaker output. In a step 608, the feedback control 104 causes the user devices to turn off their microphones. Next, in a step 710, the feedback control 104 will, on a user by user basis, cause a test tone or tones to be generated and played at the user device(s). Finally, in a step 712, the feedback control 104 will provide control for all devices for which the tones were detected, although typically not the host device, which may provide speaker and microphone services for the conference. As noted above, feedback control can include detecting a tone above a certain threshold or by detecting a tone having particular audio content. It is noted that, while discussed with reference to a conference having a substantially common start time among all the participants, similar procedures can be used when a participant later joins an ongoing conference.

It is noted that, in certain embodiments, the server 101 may use the device presence state, as determined via the presence control 316, in addition to or instead of the IP address and tone detection to determine if devices are collocated. For example, the system may be configured to deem a presence state of "In Meeting" to refer to a particular meeting location. Alternately, a special presence state may be defined identifying a particular location.

Figure 8:
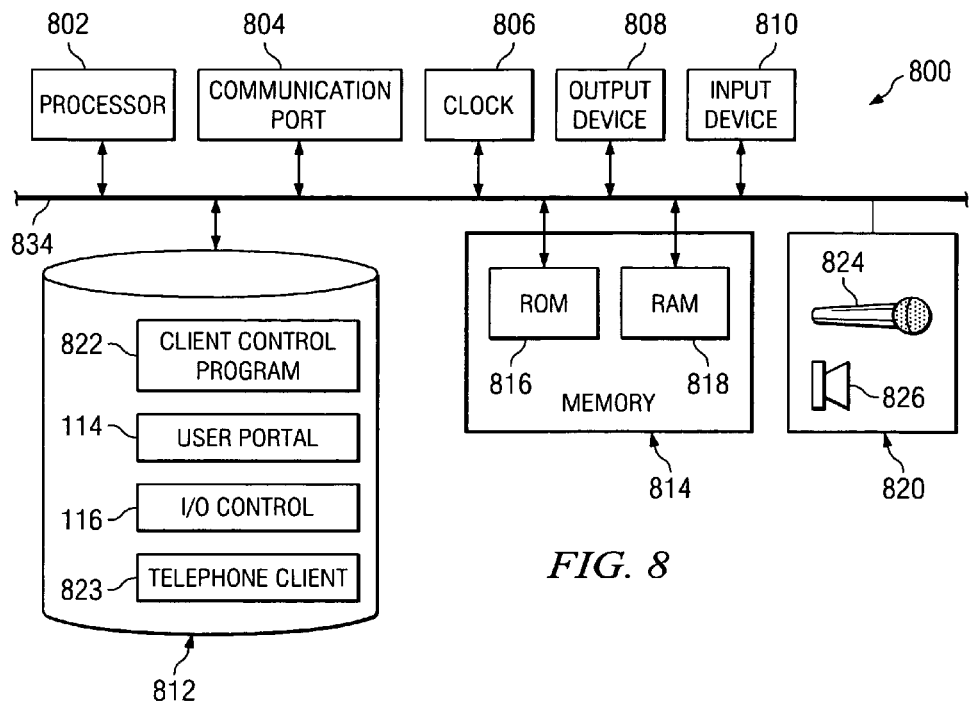
FIG. 8 is a block diagram of an exemplary user device according to an embodiment of the present invention.

Now referring to FIG. 8, a representative block diagram of a computer or processing device 800 suitable for use as a user device according to embodiments of the present invention is shown. In particular, the computer 800 may be a device suitable teleconferencing in accordance with embodiments of the present invention. In some embodiments, the computer 800 may include or operate a web browser or server access portal 114 and an peripheral control 116. The computer 800 may also include or interface to a telephony client 823 for implementing telephony functions. The computer 800 may be embodied as a single device or computer, a networked set or group of devices or computers, a workstation, mainframe or host computer, etc. In some embodiments, the computer 800 may implement one or more elements of the methods disclosed herein.

The computer 800 may include a processor, microchip, central processing unit, or computer 802 that is in communication with or otherwise uses or includes one or more communication ports or network interfaces 804 for communicating with user devices and/or other devices. The communication ports 804 may include such things as telephone adapters, local area network adapters, wireless communication devices, Bluetooth technology, etc. The computer 800 also may include an internal clock element 806 to maintain an accurate time and date for the computer 800, create time stamps for communications received or sent by the computer 800, etc.

If desired, the computer 800 may include one or more output devices 808 such as a printer, infrared or other transmitter, antenna, display screen or monitor, text to speech converter, etc., as well as one or more input devices 810 such as a bar code reader or other optical scanner, infrared or other receiver, antenna, magnetic stripe reader, image scanner, roller ball, touch pad, joystick, touch screen, computer keyboard, computer mouse, etc. An audio peripheral control 820 may also interface a microphone 824 and speaker 826 in accordance with embodiments of the present invention.

In addition to the above, the computer 800 may include a memory or data storage device 812 to store information, software, databases, documents, communications, device drivers, etc. The memory or data storage device 812 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 812 may include various combinations of moveable and fixed storage. The computer 800 also may include memory 814, such as ROM 816 and RAM 818.

The processor 802 and the data storage device 812 in the computer 800 each may be, for example: (i) located entirely within a single computer or other computing device; or (ii) connected to each other by a remote communication medium, such as a serial port cable, telephone line or radio frequency transceiver. In one embodiment, the computer 800 may be implemented as one or more computers that are connected to a remote server computer, as will be explained in greater detail below.

A conventional personal computer or workstation with sufficient memory and processing capability may be used as the computer 800. The computer 800 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 802. Other suitable processors may be available from Motorola, Inc., AMD, or Sun Microsystems, Inc. The processor 802 also may be embodied as one or more microprocessors, computers, computer systems, etc.

Software may be resident and operating or operational on the computer 800. The software may be stored on the data storage device 812 and may include a client control program 822, a server access client or portal, such as a browser 114, a peripheral control program 116, and a telephony client or interface program 826.

The client control program 822 may implement an operating system, such as Microsoft Windows. The server access portal 114 may implement a World Wide Web or Internet browser, such as Microsoft Explorer, Netscape Navigator, or Mozilla Firefox. The telephony client 823 may implement a telephony application or may interface to a separate telephone. The peripheral control program 116 may include, for example, suitable programming or commands to control operation of the speaker and microphone. In addition, in certain embodiments, the peripheral control 116 can supervise the generation, storage, or reception of one or more audio files or tones. It is noted that, while illustrated as software stored in storage medium 812, the various control modules in accordance with embodiments of the present invention may also include related firmware and/or hardware components. Thus, the figure is exemplary only.

The client control program 822, server access portal 114, peripheral control 116, and telephony client 826 may control the processor 802. The processor 802 may perform instructions of the control programs and clients, and thereby operate in accordance with the methods described in detail herein. The control programs and clients may be stored in a compressed, uncompiled and/or encrypted format. The control programs and clients furthermore include program elements that may be necessary, such as an operating system, a database management system and device drivers for allowing the processor 802 to interface with peripheral devices, databases, etc. Appropriate program elements are known to those skilled in the art, and need not be described in detail herein.

According to some embodiments, the instructions of the control program and clients may be read into a main memory from another computer-readable medium, such as from the ROM 816 to the RAM 818. Execution of sequences of the instructions in the control program causes the processor 802 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 802, communication ports 804, clock 806, output device 808, input device 810, data storage device 812, audio peripheral control 820, ROM 816 and RAM 818 may communicate or be connected directly or indirectly in a variety of ways. For example, the processor 802, communication ports 804, clock 806, output device 808, input device 810, data storage device 812, audio peripheral control 820, ROM 816 and RAM 818 may be connected via a bus 834.

While specific implementations and hardware/software configurations for the computer 800 have been illustrated, it should be noted that other implementations and hardware configurations are possible and that no specific implementation or hardware/software configuration is needed. Thus, not all of the components illustrated in FIG. 8 may be needed for the computer 800 implementing the methods disclosed herein.

Figure 9:
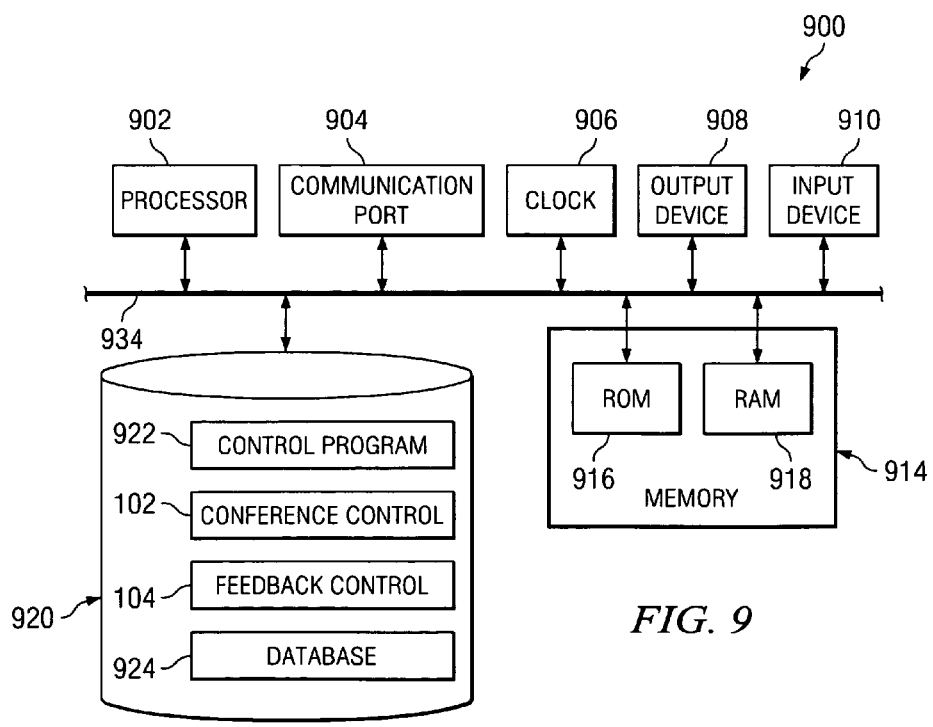
FIG. 9 is a block diagram of a server according to an embodiment of the present invention.

FIG. 9 is a diagram illustrating a server 900 according to embodiments of the present invention. The server 900 may be representative, for example, of the server of FIG. 1. In some embodiments, the server 900 may include or operate a conference control 102 and a feedback control 104 The server 900 may be embodied as a single device or computer, a networked set or group of devices or computers, a workstation, mainframe or host computer, etc. In some embodiments, the server 900 may implement one more elements of the methods disclosed herein.

The server 900 may include a processor, microchip, central processing unit, or computer 902 that is in communication with or otherwise uses or includes one or more communication ports 904 for communicating with user devices and/or other devices. The communication ports 904 may include such things as local area network adapters, wireless communication devices, telephone network adapters, Bluetooth technology, etc. The server 900 also may include an internal clock element 908 to maintain an accurate time and date for the server 900, create time stamps for communications received or sent by the server 900, etc.

If desired, the server 900 may include one or more output devices 908 such as a printer, infrared or other transmitter, antenna, audio speaker, display screen or monitor, text to speech converter, etc., as well as one or more input devices 910 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 900 may include a memory or data storage device 920 to store information, software, databases, documents, communications, device drivers, etc. The memory or data storage device 920 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 900 also may include memory 914, such as ROM 919 and RAM 919.

The processor 902 and the data storage device 920 in the server 900 each may be, for example: (i) located entirely within a single computer or other computing device; or (ii) connected to each other by a remote communication medium, such as a serial port cable, telephone line or radio frequency transceiver. In one embodiment, the server 900 may be implemented as one or more computers that are connected to a remote server computer for maintaining databases.

A conventional personal computer or workstation with sufficient memory and processing capability may be used as the server 900. The server 900 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 902. Other suitable processors may be available from Motorola, Inc., AMD, or Sun Microsystems, Inc. The processor 902 also may be embodied as one or more microprocessors, computers, computer systems, etc.

Software may be resident and operating or operational on the server 900. The software may be stored on the data storage device 920 and may include a control program 922 for operating the server, databases, etc. The control program 922 may include or interface to the conference control 102 and feedback control 104, as well as other modules of FIG. 3 (not shown).

The client control program 912 may implement an operating system, such as Microsoft Windows. The control program and control units may control the processor 902. The processor 902 may perform instructions of the control programs, and thereby operate in accordance with the methods described in detail herein. The control program and control units may be stored in a compressed, uncompiled and/or encrypted format. The control program and control units furthermore includes program elements that may be necessary, such as an operating system, a database management system and device drivers for allowing the processor 902 to interface with peripheral devices, databases, etc. Appropriate program elements are known to those skilled in the art, and need not be described in detail herein. It is noted that, while illustrated as software stored in storage medium 912, the various control modules in accordance with embodiments of the present invention may also include related firmware and/or hardware components. Thus, the figure is exemplary only.

The server 900 also may include or store information regarding identities, user devices, communications, etc., in database(s) 924. Information regarding other application program data may be stored in application database (not shown). In some embodiments, some or all of one or more of the databases may be stored or mirrored remotely from the server 900.

According to some embodiments, the instructions of the control program may be read into a main memory from another computer-readable medium, such as from the ROM 919 to the RAM 919. Execution of sequences of the instructions in the control program causes the processor 902 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 902, communication ports 904, clock 908, output device 908, input device 910, data storage device 912, ROM 919, and RAM 919 may communicate or be connected directly or indirectly in a variety of ways. For example, the processor 902, communication ports 902, clock 908, output device 908, input device 910, data storage device 912, ROM 919, and RAM 919 may be connected via a bus 934.

While specific implementations and hardware/software configurations for the server 900 have been illustrated, it should be noted that other implementations and hardware configurations are possible and that no specific implementation or hardware/software configuration is needed. Thus, not all of the components illustrated in FIG. 9 may be needed for the server 900 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A conferencing method, comprising:
   identifying, by a conference controller, a preliminary set of conference participants in the same site;
   muting, by a feedback controller, a microphone associated with each conference participant of the preliminary set;
   generating, by the feedback controller, one or more test tones for playing on a speaker associated with each conference participant of the preliminary set;
   opening, by the feedback controller, the microphone associated with each conference participant of the preliminary set; and
   detecting, by the feedback controller, as collocated conference participants for whom the microphone detects the one or more test tones.

2. A conferencing method in accordance with claim 1, further including collectively muting, by the feedback controller, microphones of a plurality of collocated participants.

3. A conferencing method in accordance with claim 1, further including collectively reducing, by the feedback controller, a volume of speakers of a plurality of collocated participants.

4. A conferencing method in accordance with claim 1, wherein said identifying the preliminary set includes determining which of a pool of potential conference participants is associated with an IP address correlated with a site of the conference.

5. A conferencing method in accordance with claim 1, wherein said identifying the preliminary set includes determining which of a pool of potential conference participants is associated with a presence state correlated with a site of the conference.

6. A telecommunications system, comprising:
   a network;
   a plurality of user devices operably coupled to said network, said user devices comprising a first user device and a second user device, each of the user devices having a microphone and a speaker; and
   a collaboration server configured to cause playing of one or more test tones at said second user device, detect as collocated user devices the first and second user devices if the microphone of the first user device detects the one or more test tones sent to the second user device and compensate for feedback for said collocated user devices.

7. A telecommunications system in accordance with claim 6, said collaboration server configured to identify a preliminary presence of said user devices based on IP addresses correlated with a collaboration site.

8. A telecommunications system in accordance with claim 6, said collaboration server configured to identify a preliminary presence of said user devices based on presence states correlated with a collaboration site.

9. A telecommunications system in accordance with claim 6, wherein said collaboration server is configured to compensate for said feedback by muting a microphone of associated ones of said devices.

10. A telecommunications system in accordance with claim 6, wherein said collaboration server is configured to compensate for said feedback by lowering a volume of speakers of associated one of said user devices.

11. A conferencing system, comprising:
    means for identifying a preliminary set of conference participants collocated in the same site;
    means for muting a microphone associated with each conference participant of the preliminary set;
    means for generating one or more test tones for playing on a speaker associated with each conference participant of the preliminary set;
    means for opening the microphone associated with each conference participant of the preliminary set; and
    means for detecting as collocated conference participants for who the microphone detects the one or more test tones.

12. A conferencing system in accordance with claim 11, further including means for collectively muting microphones of a plurality of collocated participants.

13. A conferencing system in accordance with claim 11, further including means for collectively reducing the volume of speakers of a plurality of collocated participants.

14. A conferencing system in accordance with claim 11, wherein said means for identifying a preliminary set includes means for determining which of a pool of potential conference participants is associated with an IP address correlated with a site of a conference.

15. A telecommunications system, comprising:
    a conference controller configured to supervise teleconferences; and
    a feedback controller configured to monitor locations of user devices participating in a particular teleconference and provide feedback control to user devices collocated in the same site; and wherein said feedback control includes transmitting commands to user devices to turn off associated microphones and speakers; on a device by device basis, causing the microphones and speakers to be turned on and one or more tones to be played; detecting as collocated devices for which the microphones detect the one or more tones; and providing one or more I/O commands to control speaker or microphone to control feedback.

16. A telecommunications system in accordance with claim 15, wherein said one or more I/O commands are provided from a remote feedback controller to a user device.

17. A telecommunications system in accordance with claim 15, wherein said one or more I/O commands are provided locally at a user device responsive to detection of the one or more tones.

* * * * *